Patented Sept. 20, 1932

1,878,945

UNITED STATES PATENT OFFICE

HENRY J. LUFF, OF CLEVELAND HEIGHTS, OHIO, ASSIGNOR TO WILLARD J. LUFF, OF CLEVELAND HEIGHTS, OHIO

JOINT FOR WASTE PIPES AND THE LIKE

Application filed November 18, 1927. Serial No. 234,194.

The present invention, relates as indicated, to joints for waste pipes and the like, and the primary object of the invention is to provide a joint between pipes of analogous or non-analogous materials, which joint shall be inexpensive and easily formed and yet perfectly water-tight and sufficiently stable. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
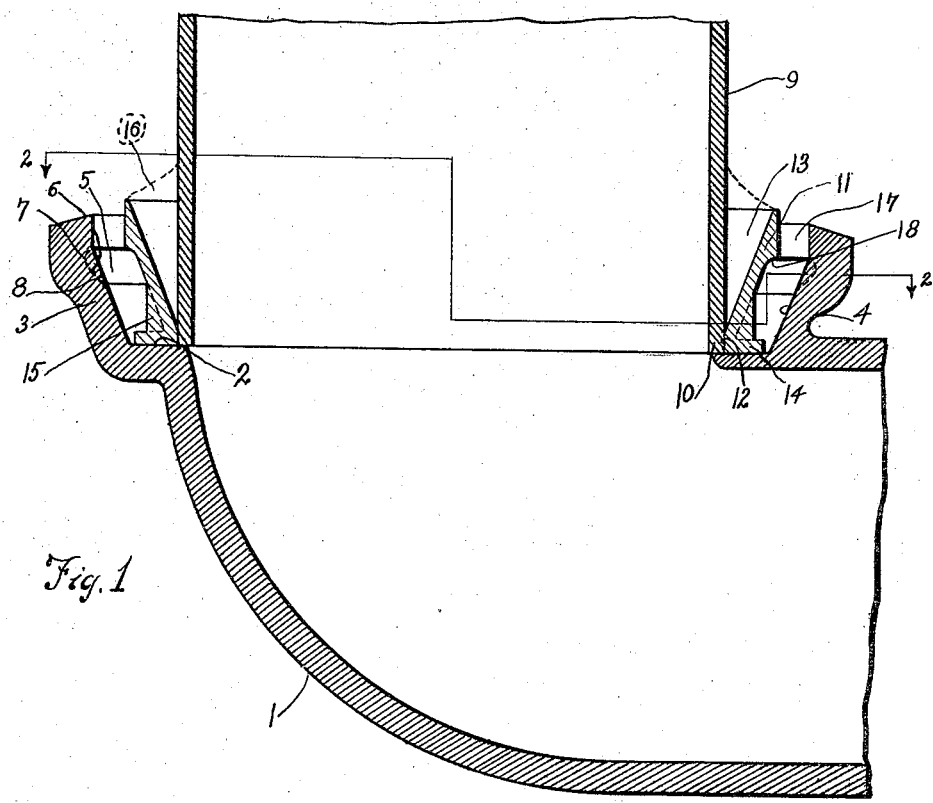
Figure 2:
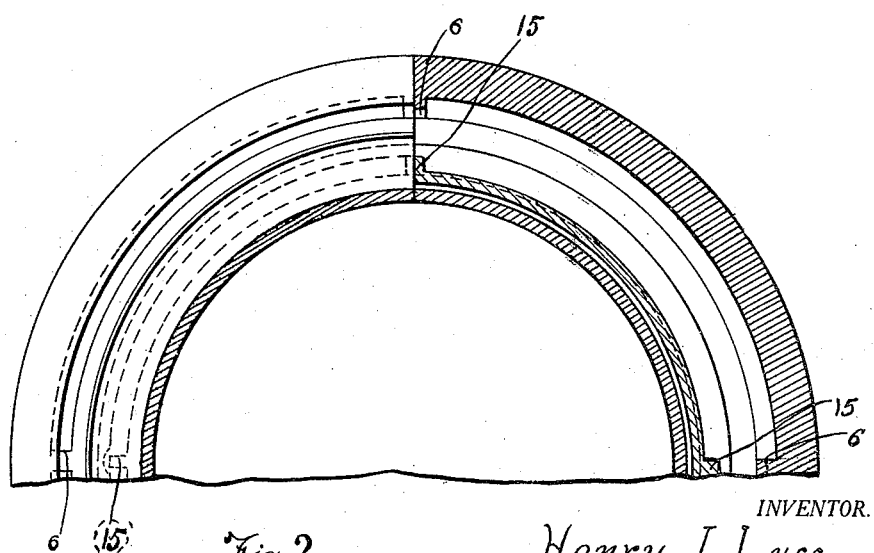

In said annexed drawing:

Fig. 1 is a transverse sectional view of a joint formed according to the present invention, and Fig. 2 is a horizontal section on the line 2—2 of Fig. 1 and looking in the direction of the arrows.

I have illustrated a joint between a cast iron pipe or fitting 1 and a lead pipe 9, but it is to be distinctly understood that the present invention is not limited to joints between pipes of such materials, but may be applied to joints between pipes of any materials. It is best adapted for use where a pipe of relatively slight strength or of relatively weak and ductile material is fitted into a hub of heavier construction.

The pipe 1 is provided adjacent its mouth with a transverse, annular seat 2 which seat is circumscribed by a hub 3 projecting outwardly therefrom to a point near the top where it becomes vertical. The inner surface 4 of said hub 3 is provided approximately midway of its length with a groove 5 interrupted at spaced points on its circumference by ribs 6. The groove 5 is substantially half-pear shape in cross-section, its greatest depth being adjacent its upper or outer side as is indicated at 7, while adjacent its lower side the groove tapers smoothly into the surface 4 as indicated at 8.

An upper pipe 9 is inserted within the hub 3 with its lower end 10 resting on the seat 2. A brass ferrule or collar 11, flared to a point near the top where it becomes vertical, is sleeved over the pipe 9 and this ferrule also rests upon the seat 2. The collar 11 has an internal diameter adjacent its lower end 12 substantially equal to the external diameter of the pipe 9, and said collar flares outwardly and upwardly therefrom to provide an angular space 13 between said collar and said pipe 9. At its lower end, the collar is formed with a flange 14 adapted to rest evenly on the seat 2, and at spaced points about its periphery, said collar is provided with short ribs 15 between said flange 14 and the flared wall thereof. The space 13 is adapted to receive poured solder 16 for forming a soldered joint between the collar 11 and the pipe 9 as is indicated in dotted lines in Fig. 1, and this solder may preferably take the form of a wiped joint.

The space 17 between the collar 11 and the hub 3 is adapted to be packed with some nonabsorbent calking material such as poured lead over oakum.

The present joint finds its most efficient adaptation in the connection between the waste pipe which is run beneath the floor level of a room and the lead pipe leading from a water closet or similar fixture. Such fixtures are often subject to shocks which cause either vertical or lateral movement or combinations thereof, and consequently it is desirable to have a connection which is as flexible as possible. Therefore it is desirable that the joint between the lead pipe and the waste pipe shall be composed of lead to the fullest extent possible, and it is necessary to provide a joint which will not pull apart in case bending forces are applied to the pipe 9. The wiped or other soldered joint 16 will outline a relatively large joint area, and will thus prevent the joint from pulling apart in case of bending of the pipe 9. The flange 14 of the collar 11 prevents the lead which is poured into the space 17 from flowing while molten beneath said collar 11.

Attention may here be called to the desirability of a lead pipe to connect the fixture to the waste pipe, due to the fact that such pipe may be readily bent to conform to misalignments of the connection for such fixture and the mouth of the waste pipe. Furthermore, a lead pipe may be very easily cut to the desired length on the job.

The shape of the groove 5 is an important feature of my invention, since it provides the greatest resistance to upward movement of the collar 11. When the lead is poured and calked into the space 17, it is forced tightly into the groove 5 and also about the ribs 15, under the projection or shoulder 18 on the collar 11, and against the upper surface of the flange 14. Thus any tendency of the collar 11 to move upwardly out of the space defined by the hub 3 is resisted by the calked joint forming material between the flange 14 and the upper portion 7 of the groove 5. Furthermore, when the lead is poured and calked into the space 17, it is forced around the ribs 6 and 15, and thus it will be seen that any tendency of the pipe 9 or collar 11 to rotate about a vertical axis is overcome.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a waste pipe connection, a pipe or fitting of rigid material having an inlet port, a hub surrounding said port, a seat in the base of said hub, said hub having its end portion parallel to the axis of the port, said hub being recessed outwardly from said end portion by an annular groove, and a pipe of ductile material bearing on said seat, a collar interiorly outwardly flared from said ductile pipe and having a flange bearing on said seat, said collar having its exterior surface flared outwardly and having its outer end portion parallel to the axis of the port.

2. In a waste pipe connection, a pipe or fitting of rigid material having an inlet port, a hub surrounding said port, a seat in the base of said hub, said hub having its end portion parallel to the axis of the port, said hub being recessed outwardly from said end portion by an annular groove, ribs at circumferential intervals within said groove, and a pipe of ductile material bearing on said seat, a collar interiorly outwardly flared from said ductile pipe and having a flange bearing on said seat, ribs at circumferential intervals upon the exterior surface of said collar, said collar having its exterior surface flared outwardly to an end portion parallel to the axis of the port.

Signed by me this 12th day of November, 1927.

HENRY J. LUFF.